United States Patent [19]

Hanyu et al.

[11] Patent Number: 4,879,059

[45] Date of Patent: Nov. 7, 1989

[54] LIQUID CRYSTAL DEVICE

[75] Inventors: Yukio Hanyu, Yokohama; Yukiko Futami, Sagamihara, both of Japan

[73] Assignee: Canon Kabushiki Kaisha, Tokyo, Japan

[21] Appl. No.: 91,105

[22] Filed: Aug. 31, 1987

[30] Foreign Application Priority Data

Sep. 2, 1986 [JP] Japan ................... 61-207012
Aug. 6, 1987 [JP] Japan ................... 62-197827

[51] Int. Cl.$^4$ .................. G02F 1/13; C09K 19/56
[52] U.S. Cl. .................. 252/299.4; 252/299.01; 350/340; 350/341; 350/350 S; 458/1
[58] Field of Search .................. 252/299.01, 299.4; 350/350 S, 340, 341; 428/1

[56] References Cited

U.S. PATENT DOCUMENTS

| | | | |
|---|---|---|---|
| 3,994,567 | 11/1976 | Matsuo | 252/299.4 |
| 4,068,923 | 1/1978 | Toida | 252/299.4 |
| 4,278,326 | 7/1981 | Kawamura et al. | 250/341 |
| 4,311,785 | 1/1982 | Ahne et al. | 350/341 |
| 4,366,230 | 12/1982 | Ahne et al. | 350/341 |
| 4,381,886 | 5/1983 | Yokokura et al. | 350/341 |
| 4,405,208 | 9/1983 | Shirai | 250/341 |
| 4,494,824 | 1/1985 | Nakamura et al. | 428/1 |
| 4,514,043 | 4/1985 | Ahne et al. | 350/341 |
| 4,561,726 | 12/1985 | Goodby et al. | 350/341 |
| 4,576,732 | 3/1986 | Isogai et al. | 252/299.01 |
| 4,586,791 | 5/1986 | Isogai et al. | 350/341 |
| 4,590,103 | 5/1986 | Ahne | 252/299.4 |
| 4,593,977 | 6/1986 | Takamatsu et al. | 350/341 |
| 4,634,228 | 1/1987 | Iwasaki | 350/341 |
| 4,723,839 | 2/1988 | Nakanowatari et al. | 350/341 |
| 4,749,777 | 6/1988 | Kohtoh et al. | 252/299.01 |

FOREIGN PATENT DOCUMENTS

| | | | |
|---|---|---|---|
| 0059790 | 9/1982 | European Pat. Off. | 252/299.4 |
| 0091661 | 10/1983 | European Pat. Off. | 350/341 |
| 130481 | 1/1985 | European Pat. Off. | 252/299.4 |
| 231781 | 8/1987 | European Pat. Off. | 252/299.01 |
| 247637 | 12/1987 | European Pat. Off. | 252/299.4 |
| 249881 | 12/1987 | European Pat. Off. | 252/299.4 |
| 3605147 | 8/1986 | Fed. Rep. of Germany | 350/341 |
| 56-111833 | 9/1981 | Japan | 350/341 |
| 57-135921 | 8/1982 | Japan | 252/299.4 |
| 58-17417 | 2/1983 | Japan | 350/341 |
| 58-17418 | 2/1983 | Japan | 350/341 |
| 58-62620 | 4/1983 | Japan | 250/341 |
| 60-230605 | 11/1985 | Japan | 252/299.4 |
| 0230625 | 11/1985 | Japan | 350/341 |
| 61-47932 | 3/1986 | Japan | 350/341 |
| 61-226732 | 10/1986 | Japan | 252/299.4 |
| 61-226733 | 10/1986 | Japan | 252/299.4 |
| 62-144141 | 6/1987 | Japan | 252/299.4 |
| 2101760 | 1/1983 | United Kingdom | 350/341 |

OTHER PUBLICATIONS

Chem. Abs., vol. 99, No. 550 (1983), 203665n.

*Primary Examiner*—Teddy S. Gron
*Attorney, Agent, or Firm*—Fitzpatrick, Cella, Harper & Scinto

[57] ABSTRACT

A liquid crystal device comprises a pair of substrates and a ferroelectric liquid crystal disposed between the substrates. At least one of the pair of substrates has an alignment control film formed of an aliphatic polyimide resin having a function of aligning said plurality of layers preferentially in one direction. The aliphatic polyimide resin film stably provides a uniform alignment state with a large tilt angle than a conventional alignment control film of polyimide or polyvinyl alcohol over a long period. The liquid crystal device also provides a color tone of black in its darkest state.

23 Claims, 5 Drawing Sheets

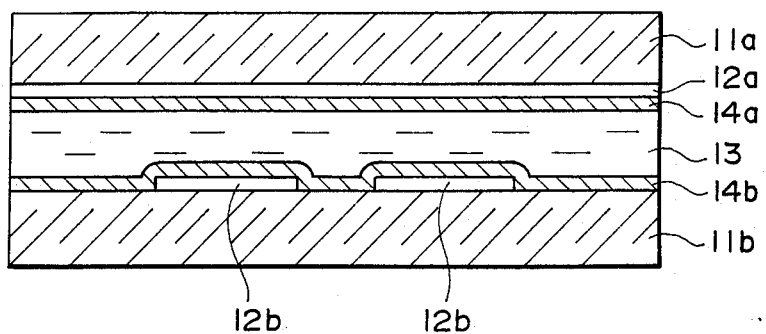
FIG. IA
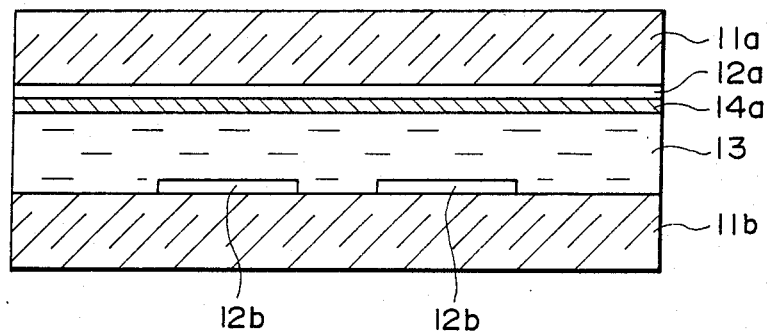
FIG. IB

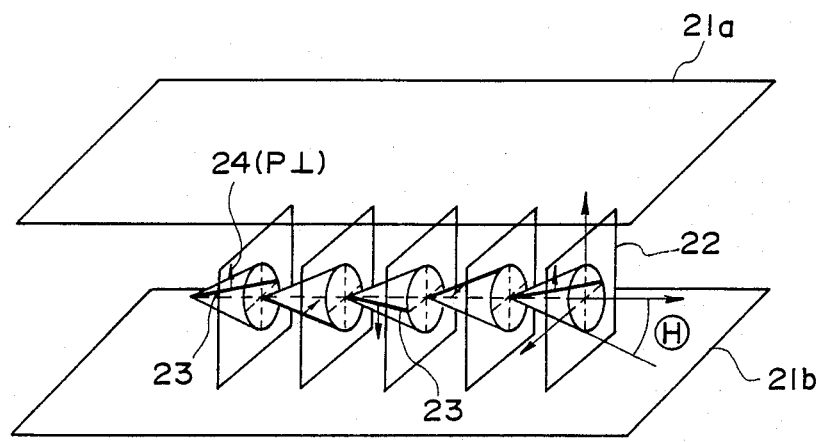
F I G. 2
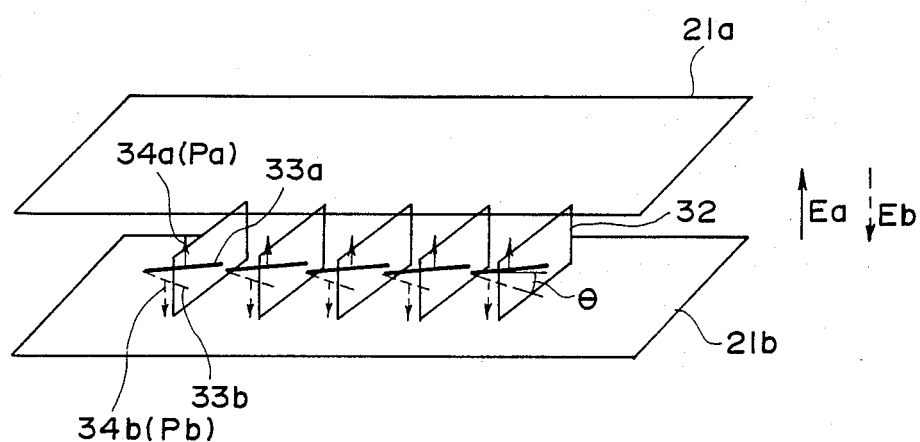
F I G. 3

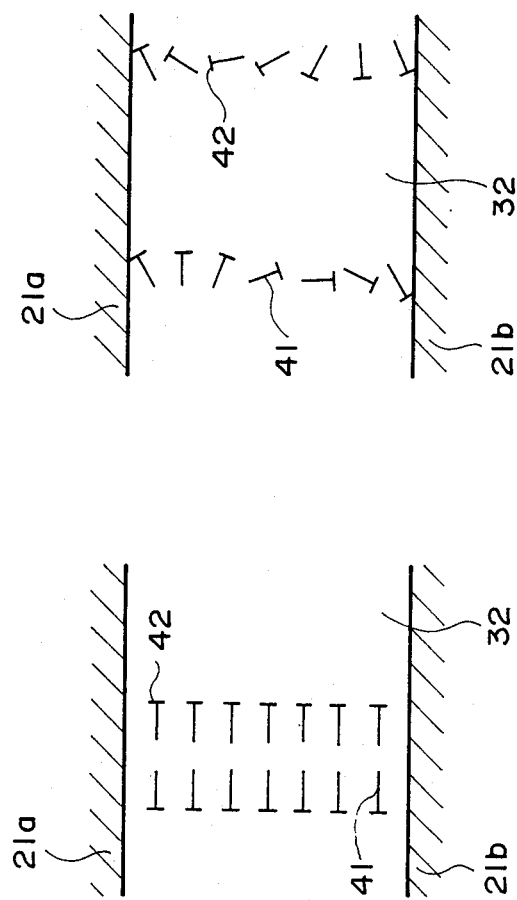

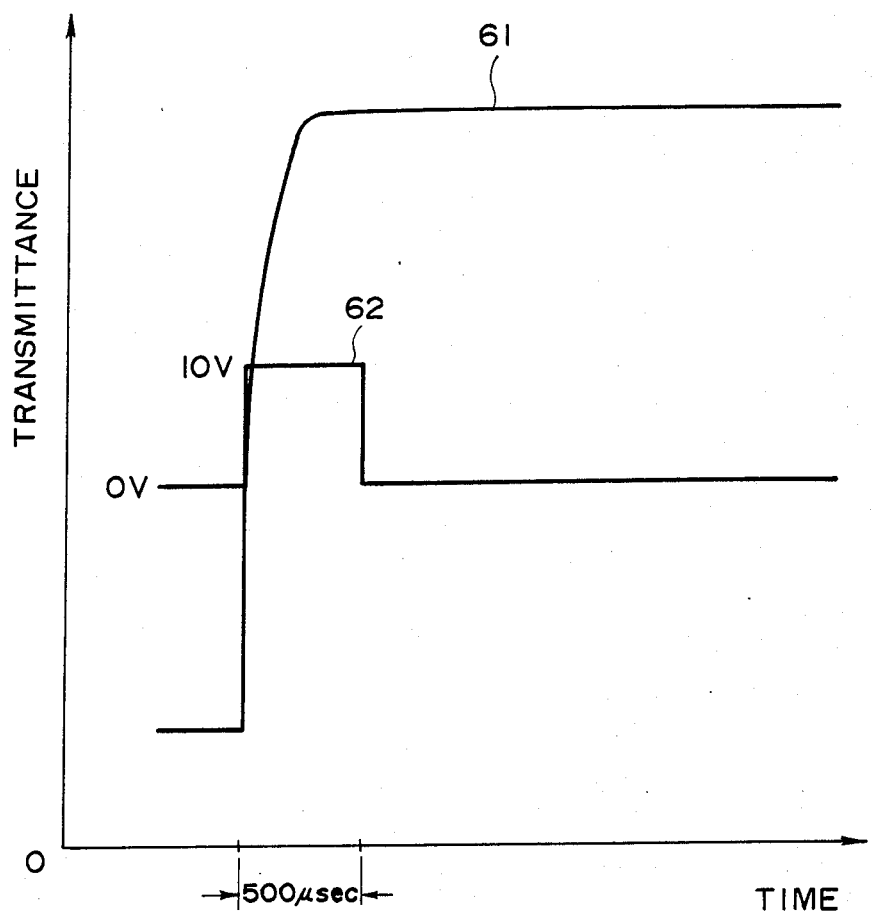
F I G. 6

LIQUID CRYSTAL DEVICE

FIELD OF THE INVENTION AND RELATED ART

This invention relates to a liquid crystal device to be used in a liquid crystal display device or a liquid crystal-optical shutter, etc., particularly a liquid crystal device by use of a ferroelectric liquid crystal, more particularly to a liquid crystal device improved in display characteristics through improvement in initial alignment of the liquid crystal molecules and to a liquid crystal device which can effect a white-and-black display with a dark color of low transmittance in the dark state and is also suitably applicable to a color display.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal has generally chiral smectic C phase (SmC*) or H phase (SmH*) and, under this state, shows a property of taking either one of a first optically stable state and a second optically stable state responding to an electrical field applied and maintaining such state in the absence of an electrical field, namely bistability, and also has a rapid response to the change in electrical field. Thus, it is expected to be utilized in a high speed and memory type display device.

For an optical modulating device by use of a liquid crystal having such bistability to exhibit desirable driving characteristics, it is required that the liquid crystal arranged between a pair of substrates should be in such a state that conversion between the above two stable states may occur effectively irrespective of the application of an electrical field. For example, for a ferroelectric liquid crystal having SmC* or SmH* phase, it is necessary to form a domain (monodomain) in which the liquid crystal molecular layers having the SmC* or SmH* phase are arranged perpendicular to the substrate surfaces, and therefore the liquid crystal molecular axes are arranged in substantially parallel to the substrate surfaces. Further, when a ferroelectric liquid crystal device is used as a white-and-black character display device or a color display device, it is required to provide a black state of low transmittance under its darkest, e.g., first stable state in combination with cross nicol polarizers sandwiching it. In order to satisfy these functional requirements, a specific alignment state suitable therefor is required to be formed.

As a method for aligning a ferroelectric liquid crystal, it has been generally known to use an alignment control film provided with a uniaxial orientation treatment by way of rubbing or oblique vapor deposition.

Most of these conventional alignment methods have been used for ferroelectric liquid crystals having a helical structure and exhibiting no bistability. For example, the alignment method disclosed in European Laid-Open Patent Application No. 91661 or Japanese Laid-Open Patent Application No. 230635/1985 controls alignment of a ferroelectric liquid crystal with a totally aromatic polyimide, polyamide or polyvinyl alcohol film subjected to rubbing treatment under the state of a helical structure exhibiting no bistability.

However, when the alignment control film of the prior art as described above is applied for alignment control of a ferroelectric liquid crystal with a non-helical structure exhibiting bistability reported by Clark and Lagerwall, the problems as described below are involved.

That is, according to our experiments, it has been found that a tilt angle $\theta$ (an angle shown in FIG. 3 as described below) in a ferroelectric liquid crystal with a nonhelical structure obtained by alignment with an alignment control film of the prior art has become smaller as compared with a tilt angle Ⓗ (the angle Ⓗ is a half of the apex angle of the cone shown in FIG. 2 as described below) in the ferroelectric liquid crystal having a helical structure. Particularly, the tilt angle $\theta$ in a ferroelectric liquid crystal with a nonhelical structure obtained by alignment with alignment control films of the prior art was found to be generally several degrees, and the transmittance at that time was at most about 3 to 5%.

Thus, according to Clark and Lagerwall, the tilt angle in a ferroelectric liquid crystal with a nonhelical structure realizing bistability should have the same angle as the tilt angle in the ferroelectric liquid crystal having a helical structure, but in fact the tilt angle $\theta$ in a nonhelical structure is smaller than the tilt angle Ⓗ in a helical structure. In other words, for the tilt angle $\theta$ to take the maximum tilt angle Ⓗ the liquid crystal molecules should be in the uniform alignment state shown in FIG. 4. Practically, however, they are in the spaly alignment state wherein adjacent respective liquid crystal molecules are twisted at a twist angle as shown in FIG. 5, so that there has been a problem that no sufficiently large tilt angle $\theta$ can be formed. Also, a liquid crystal device under the splay alignment state exhibits an optical responsive characteristic to a pulse signal as shown in FIG. 7, and the optical responsive characteristic has posed a problem of causing flickering on a display picture when multiplexing drive is performed.

Furthermore, according to our experiments, under an alignment state obtained by using a conventional polyimide alcohol film as an alignment control film, it is possible to obtain a good shutter performance with a dark tone of low transmittance under the darkest or closed shutter state, but a clear image cannot be obtained in actual matrix driving because of alignment defects such as zigzag defects resulting in poor bistability at the time of switching. On the other hand, an alignment control film of totally aromatic polyimide film provides good uniform alignment state with few defects and good bistability at the time of switching but again fails to provide a clear image because of a bluish color under the darkest or closed state.

SUMMARY OF THE INVENTION

Accordingly, an object of the present invention is to solve the problems as described above, namely to provide a liquid crystal device improved in transmittance at the time of shutter opening of the pixels by increasing the tilt angle in a ferroelectric liquid crystal with a nonhelical structure realizing at least two stable states, particularly showing bistability.

It is also another object of the present invention to provide a liquid crystal device which is free from flickering on a display picture during multiplexing drive.

A specific object of the present invention is to realize a ferroelectric liquid crystal device with a uniform alignment state as shown in FIG. 4 by use of a specific alignment control film, whereby a liquid crystal device exhibiting an optical responsive characteristic to a pulse signal as shown in FIG. 6 and free from flickering on the picture during multiplexing drive can be realized.

Another specific object of the present invention is to provide a liquid crystal device which provides a black-colored darkest or extinguished state, is applicable to a white-and-black or color display and also has a good switching characteristic.

More specifically, according to the present invention, there is provided a ferroelectric liquid crystal device having a pair of substrates, and an alignment control film and a ferroelectric liquid crystal disposed between the pair of substrates, wherein said alignment control film comprises an aliphatic polyimide in a sense including as a preferred embodiment, an alicyclic polyimide.

The aliphatic polyimide is preferably selected from those having the structural units represented by

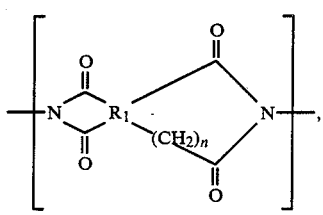
(I)

wherein $R_1$ is a tetravalent aliphatic group, and n is 0 or 1;

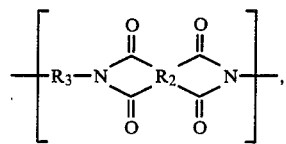
(Ia)

wherein $R_2$ is an aliphatic group, and $R_3$ is an aromatic group;

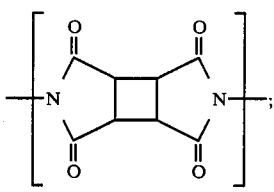
(II)

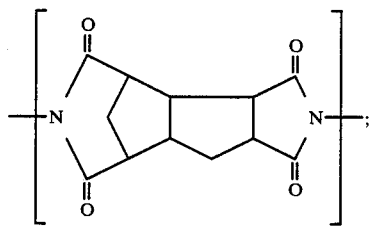
(III)

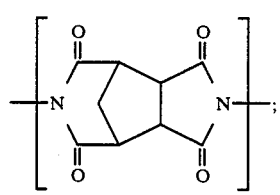
(IV)

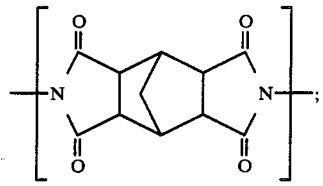
(V)

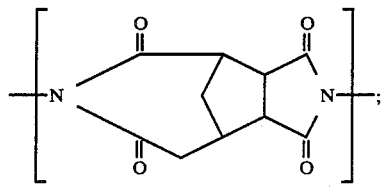
(VI)

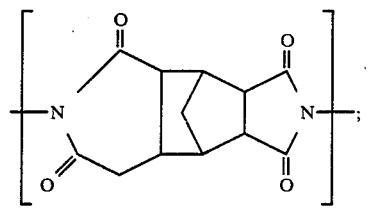
(VII)

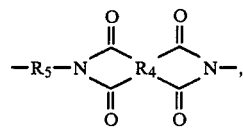
(VIII)

wherein $R_4$ is an aromatic group and $R_5$ is an aliphatic group;

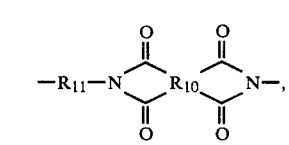
(IX)

wherein $R_6$ is an aromatic group and $R_7$ is an alicyclic group;

$$-R_9-N\underset{O\ \ O}{\overset{O\ \ O}{\diagdown}}R_8\underset{O\ \ O}{\overset{}{\diagup}}N-,\quad (X)$$

wherein $R_8$ is an alicyclic group and $R_9$ is an aromatic group;

$$-R_{11}-N\underset{O\ \ O}{\overset{O\ \ O}{\diagdown}}R_{10}\underset{O\ \ O}{\overset{}{\diagup}}N-,\quad (XI)$$

wherein $R_{10}$ and $R_{11}$ are respectively an aliphatic group; and

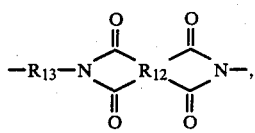

(XII)

wherein $R_{12}$ and $R_{13}$ are aliphatic group, either one of which is an alicyclic group.

As will be understood from the above-enumerated formulas, the term "aliphatic polyimide" is used to mean a polyimide as can be derived from a tetracarboxylic acid (dianhydride) and a diamine, at least one of which is aliphatic, i.e., both of which are not aromatic.

BRIEF DESCRIPTION OF THE DRAWINGS

FIGS. 1A and 1B are each a sectional view showing an embodiment of the liquid crystal device of the present invention;

FIG. 2 is a perspective view showing schematically a liquid crystal device using a ferroelectric liquid crystal with a helical structure;

FIG. 3 is a perspective view showing schematically a liquid crystal device using a ferroelectric liquid crystal with a nonhelical structure;

FIG. 4 is a sectional view showing schematically a uniform alignment state;

FIG. 5 is a sectional view showing schematically a splay alignment state;

FIG. 6 is a characteristic graph showing an optical responsive characteristic under a uniform alignment state.

DETAILED DESCRIPTION OF THE INVENTION

Figure 7:
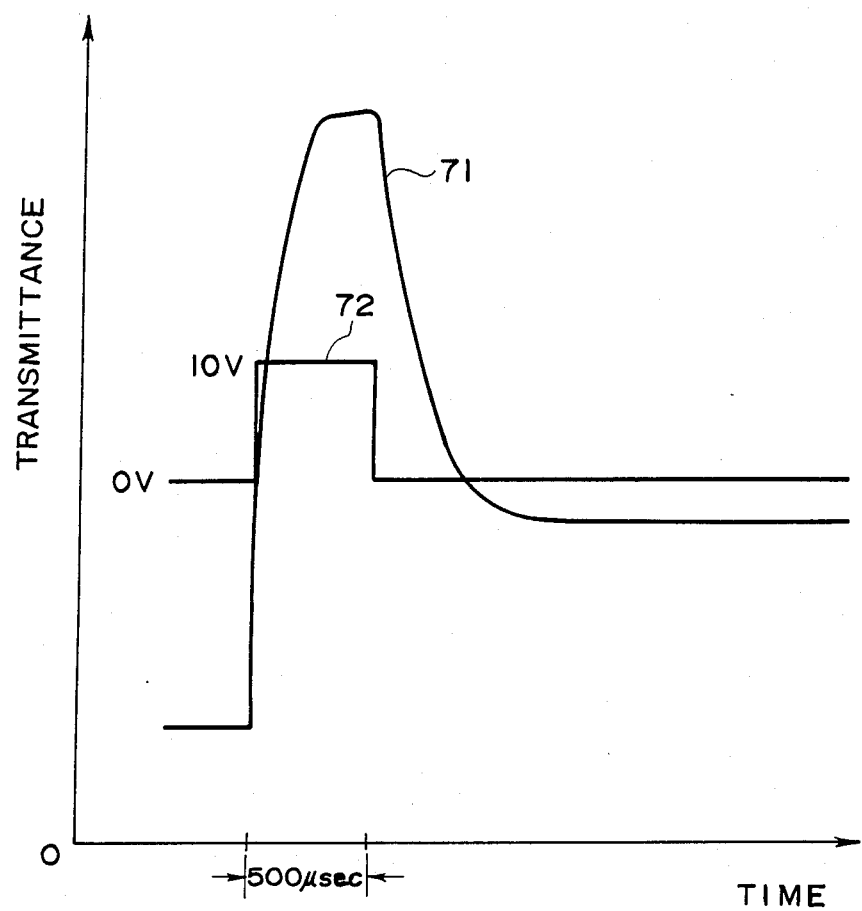
FIG. 7 is a characteristic graph showing an optical responsive characteristic under a splay alignment state.

FIGS. 1A and 1B are each a sectional view showing an embodiment of the liquid crystal device of the present invention. The liquid crystal device shown in FIG. 1A has a pair of an upper substrate 11a and a lower substrate 11b arranged in parallel and transparent electrodes 12a and 12b disposed on the respective substrates. Between the upper substrate 11a and the lower substrate 11b is interposed a ferroelectric liquid crystal, preferably a ferroelectric liquid crystal 13 with a nonhelical structure having at least two stable states.

Each of the transparent electrodes 12a and 12b is disposed in shape of a stripe for multiplexing driving of the ferroelectric liquid crystal 13, and it is preferable that the stripes are arranged to cross each other.

In the liquid crystal device shown in FIG. 1A, alignment control films 14a and 14b formed of an aliphatic polyimide resin as mentioned above are disposed on the substrate 11a and 11b, respectively.

Also, it is possible to make either one of the alignment control films 14a and 14b used in the liquid crystal device shown in FIG. 1A of an aliphatic polyimide resin and the other one of an alignment control film other than an aliphatic polyimide resin. The alignment control film to be used in this case can be made a film formed of a polyimide, a polyimide or a polyvinyl alcohol.

Also, as shown in FIG. 1B, in the present invention, it is possible to omit the alignment control film 14b used in the liquid crystal device in FIG. 1A.

In the present invention, a uniaxial orientation axis can be imparted to the alignment control films 14a and 14b as described above. The uniaxial orientation axis can be imparted preferably by rubbing. In this case, the uniaxial orientation axes as mentioned above can be made parallel to each other, but it is also possible to have them cross each other.

The aliphatic polyimide may be synthesized by dehydro-cyclization (i.e., dehydration and ring-closure) of a so-called polyamic acid which is a polycondensation product of a tetracarboxylic acid anhydride and a diamine.

The method of polymerization for causing the polycondensation is not particularly restricted, but any of solution polymerization, interfacial polymerization, bulk polymerization and solid phase polymerization can be adopted. Further, the above polyimide formation reaction may be effected as a one-stage process without isolation of the intermediately produced polyamic acid or as a two-stage process wherein the produced polyamic acid is isolated and then subjected to dehydration-ring closure into a polyimide.

A generally preferred process for the polymerization is a solution process. The solvent for the solution may be any as far as it dissolves the produced polyamic acid. Typical examples of the solvent may include: N,N-dimethylformamide, N,N-dimethylacetamide, N-methylpyrrolidone, N-methylcaprolactam, dimethyl sulfoxide, tetramethylurea, pyridine, dimethylsulfolane, hexamethylphosphoramide, and butyrolactone. These solvents may be used singly or in mixture. Further, a solvent not dissolving a polyamic acid by itself can be added to a solvent as mentioned above within an extent that the resultant solvent mixture can dissolve the polyamic acid.

The reaction temperature of the polycondensation for production of the polyamic acid may be selected at any in the range of −20°C. to 150°C., particularly in the range of −5°C. to 100°C.

For the present invention, the polyamic acid may be converted into a polyimide through dehydrocyclization ordinarily under heating. The temperature for the dehydro-cyclization may be selected at any of 150°C.–400°C., preferably 170°C.–350°C. The reaction period required for the dehydrocyclization may suitably be 30 seconds to 10 hours, preferably 5 minutes to 5 hours while it also depends on the above-mentioned reaction temperature. The conversion of the polyamic acid into the polyimide may also be promoted by means of a dehydro-cyclization catalyst. These methods may be effected under ordinary conditions for polyimide synthesis without particular restriction. As another method, a vapor-deposition polymerization process can be used wherein a tetracarboxylic acid dianhydride and a diamine are deposited from a gaseous phase to directly form a polyimide film on a substrate.

Hereinbelow, specific examples of aliphatic tetracarboxylic acid dianhydrides and diamines are enumerated.

(1) aliphatic tetracarboxylic acid dianhydride

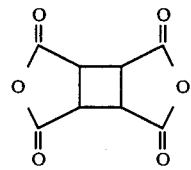

(a)

-continued
(b) 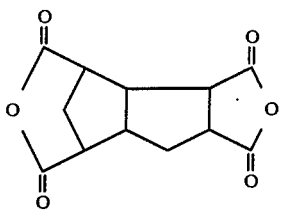
(c) 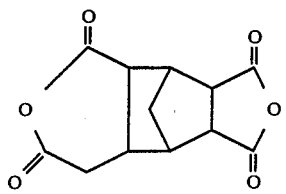
(d) 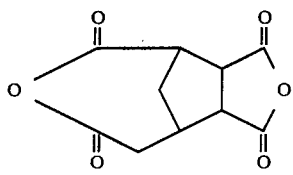
(e) 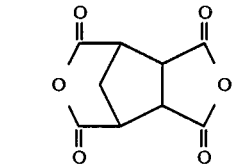
(f) 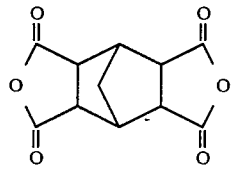
(g) 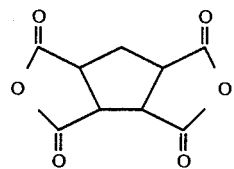
(h) 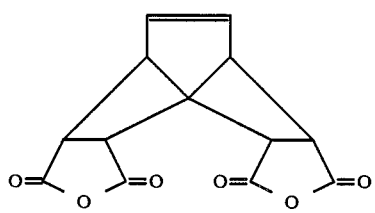
(i) 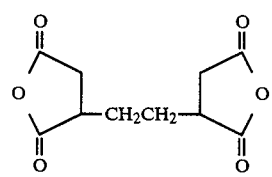
-continued
(j) 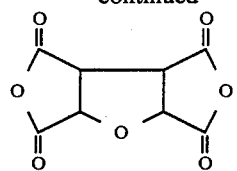
(k) 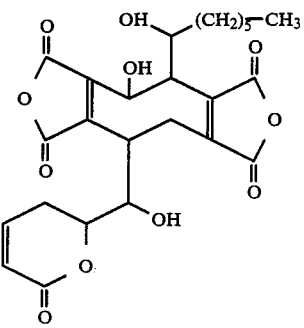
(l) 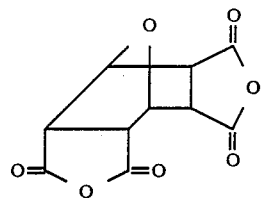
(2) aliphatic diamines
(a) 
(b) 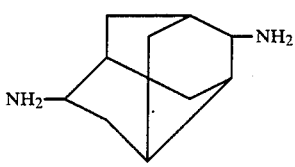
(c) 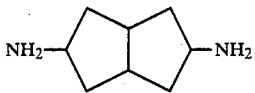
(d) 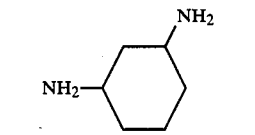
(e) $NH_2\text{-}(CH_2)_2\text{-}NH_2$
(f) 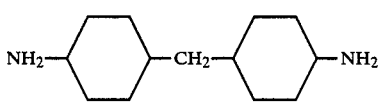
(g) $NH_2-CH_2CH_2-O-CH_2CH_2-NH_2$
When an aliphatic tetracarboxylic acid dianhydride is used, any diamine including an aromatic diamine can be used in combination therewith. Representative examples of the aromatic diamine which can be used for this purpose may include:

p-phenylenediamine, n-phenylenediamine, diaminodiphenylmethane, diaminodiphenyl ether, 2,2-diaminodiphenylpropane, diaminodiphenyl sulfone, diaminobenzophenone, diaminonaphthalene, 1,3-bis(4-aminophenoxy)benzene, 4,4'-di(4-aminophenoxy)diphenyl sulfone, and 2,2-bis(4-(4-aminophenoxy)phenyl)propane.

On the other hand, when an aliphatic diamine is used, any tetracarboxylic acid dianhydrode including an aromatic one can be used in combination therewith. Representative examples of the aromatic tetracarboxylic acid dianhydride may include: pyromellitic acid dianhydride, benzophenonetetracarboxylic acid dianhydride, biphenyltetracarboxylic acid dianhydride, naphthalenetetracarboxylic acid dianhydride, 2,2-bis(dicarboxyphenyl)sulfone dianhydride, and bis(dicarboxyphenyl)ether dianhydride.

The tetracarboxylic acid (dianhydride) and the diamine may respectively be used alone or in combination of two or more species.

A totally aliphatic polyimide, i.e., a polyimide obtained from an aliphatic tetracarboxylic acid (dianhydride) and an aliphatic diamine, is preferred in view of the color tone in the darkest display state of the resultant liquid crystal device Either one of the tetracarboxylic acid (dianhydride) and the diamine should preferably be alicyclic in order to provide an alignment control film with better durability. A totally alicyclic polyimide is most preferred.

The alignment control films 14a and 14b are formed of these aliphatic polyimides and they can also have the function as insulating films, and they are generally formed in a film thickness ranging generally from 30Å to 1μ, preferably from 50 to 2000Å, more preferably from 70 to 1000Å.

As the method for forming the film of these aliphatic polyimides, it is possible to use a method in which a solution of a polyamic acid, i.e., a polyimide precursor, dissolved in an appropriate solvent at a proportion of 0.1 wt. % to 20 wt. %, preferably 0.2 to 10 wt. %, is applied according to spinner coating, dip coating, screen printing, spray coating or roll coating, and then cured under predetermined curing conditions (e.g., heating). Alternatively, a polyimide soluble in a solvent such as N-methylpyrrolidone or γ-butyrolactone can be applied as a solution of the polyimide itself after the polyimide ring formation instead of a polyamic acid thereof.

Next, a ferroelectric liquid crystal having an arrangement of molecules forming a plurality of layers perpendicular to the faces of a pair of substrates to be used in the liquid crystal device of the present invention is to be explained.

FIG. 2 illustrates schematically an example of a ferroelectric liquid crystal cell by use of a helical structure. Substrates (glass plates) 21a and 21b are coated with transparent electrodes of $In_2O_3$, $SnO_2$ or ITO (Indium Tin Oxide), etc., and a liquid crystal of SmC* (chiral smectic C phase) is hermetically disposed therebetween so that a plurality of liquid crystal molecular layers 22 are aligned perpendicular to the glass substrates. Full lines 23 show liquid crystal molecules each having a dipole moment (P⊥) 24. A half of the apex angle of the cone at this time represents the tilt angle (θ) in the chiral smectic phase of such a helical structure. When a voltage above a certain threshold value is applied between the electrodes on the substrates 21a and 21b, the helical structure of the liquid crystal molecules 23 is unwound to orient the liquid crystal molecules 23 so that all the dipole moments (P⊥) 24 may be directed in the electrical field direction.

However, the ferroelectric liquid crystal by use of the helical structure is restored to the original helical structure under no application of electrical field, and it does not exhibit bistability as described below.

In a preferable example of the present invention, it is possible to use a ferroelectric liquid crystal device having at least two stable states in the absence of an electrical field, particularly having the bistable state as shown in FIG. 3. That is, when the thickness of the liquid crystal cell is made sufficiently thin (e.g. 1μ), the helical structure of the liquid crystal molecules will be unwound even under no application of electrical field to become a nonhelical structure as shown in FIG. 3, whereby its dipole moment assumes either Pa directed upward (34a) or Pb directed downward (34b), thus forming a bistable state. When an electrical field Ea or Eb with different polarity exceeding a certain threshold value is applied to such a cell as shown in FIG. 3, the dipole moment will change its direction upwardly 34a or downwardly 34b corresponding to the electrical field vector Ea or Eb, whereby the liquid crystal molecules become oriented to either one of the first stable state 33a or the second stable state 33b, correspondingly. A half of the angle formed between the first and second stable states corresponds to a tilt angle θ.

Use of such a ferroelectric liquid crystal as the optical modulating device gives two advantages. Firstly, the response speed is extremely rapid and secondly alignment of the liquid crystal molecules has bistability. To describe about the second point by referring to, for example, FIG. 3, application of an electrical field Ea makes liquid crystal molecules oriented to the first stable state 33a, which is stably retained even if the electrical field is removed. On the other hand, when an electrical field Eb in the opposite direction is applied, the liquid crystal molecules are oriented to the second stable state 33b to change the directions of the molecules, which state is also stably retained even if the electrical field is removed. Also, unless the electrical field Ea or Eb given exceeds a certain threshold value, the respective alignment states are also maintained. For such rapid response speed and memory effect through bistability to be realized effectively, the cell should be preferably as thin as possible, generally 0.5 to 20μ, particularly suitably 1 to 5μ. A liquid crystal-electrooptical device having a matrix electrode structure by use of this kind of ferroelectric liquid crystal is proposed by, for example, Clark and Lagerwall in U.S. Pat. No. 4,367,924.

Examples of the ferroelectric liquid crystals which can be used in the liquid crystal device of the present invention may include p-decyloxybenzylidene-p'-amino-2-methylbutylcinnamate (DOBAMBC), p-hexyloxybenzylidene-p'-amino-2-chloropropylcinnamate (HOBACPC), p-decyloxybenzylidene-p'-amino-2-methylbutyl-α-cyanocinnamate (DOBAMCC), p-tetradecyloxybenzylidene-p'-amino-2-methylbutyl-α-cyanocinnamate (TDOBAMCC), p-octyloxybenzylidene-p'-amino-2-methylbutyl-α-chlorocinnamate (OOBAMBCC), p-octyloxybenzylidene-p'-amino-2-methylbutyl-α-methylcinnamate, 4,4'-azoxycinnamic acid-bis(2-methylbutyl) ester, 4-0-(2-methyl) butylresorcylidene-4'-octylaniline, 4-(2α-methylbutyl) phenyl-4'-octyloxybiphenyl-4-carboxylate, 4-hexyloxyphenyl-4-

(2″-methylbutyl)biphenyl-4′-carboxylate, 4-octyloxyphenyl-4-(2″-methylbutyl)biphenyl-4′carboxylate, 4-heptylphenyl-4-(4″-methyllhexyl)biphenyl-4′-carboxylate, 4-(2″-methylbutyl)phenyl-4-(441-methylhexyl)-biphenyl-4′-carboxylate, etc. These can be used either alone or as a combination of two or more kinds, and it is also possible to incorporate other cholesteric liquid crystals or smectic liquid crystals within the range exhibiting ferroelectricity.

Also, in the present invention, the ferroelectric liquid crystal may be used in a chiral smectic phase, typically chiral smectic C phase (SmC*), H phase (SmH*), I phase (SmI*), K phase (SmK*) or G phase (SmG*).

FIG. 4 is a sectional view showing schematically the uniform alignment state during no application of voltage of the ferroelectric liquid crystal device, and FIG. 6 represents optical response characteristic to pulse signals under such state. That is, FIG. 4 is a sectional view as viewed in the direction normal to the vertical layers 32 formed on a plurality of chiral smectic liquid crystal molecules shown in FIG. 3. Reference numeral 41 in FIG. 4 denotes a projection (C-director) of the liquid crystal molecules 33a or 33b shown in FIG. 3 onto the perpendicular layers 32 as mentioned above, and reference numeral 42 shows the tip of liquid crystal molecules 33a or 33b relative to the perpendicular layer 32 as mentioned above. Thus, according to FIG. 4, the liquid crystal molecules within a perpendicular layer 32 are aligned in substantially parallel to each other, whereby the tilt angle $\theta$ can be made approximate to the maximum tilt angle    . This state is called a uniform alignment state.

In contrast, FIG. 5 shows an arrangement of liquid crystal molecules within a perpendicular layer 32 in the same manner as in FIG. 4. As can be seen from FIG. 5, the tips 42 of the liquid crystal molecules 41 within the perpendicular layer 32 rotate along the circumference in the direction of the liquid crystal layer. Thus, the liquid crystal molecules adjacent to the substrate 21a and 21b are not in parallel to each other, but the liquid crystal molecules within the perpendicular layer 32.are aligned under continuously twisted state from the substrate 20a toward 21b. Such alignment state is called a splay alignment state.

It has been found that the splay alignment state, while it is converted into the uniform alignment state shown in FIG. 4 under application of a certain voltage, returns to the splay alignment state shown in FIG. 5, when the applied voltage is once removed to form the memory state. Accordingly, in the splay alignment state, optical characteristics of high transmittance based on the uniform alignment state can be exhibited under application of a voltage as shown in FIG. 7, but under no application of voltage, the alignment state returns to the original splay alignment state with a small tilt angle $\theta$, to give optical characteristics of a low transmittance based on such a state.

In contrast, in the uniform alignment state shown in FIG. 4, since no splay alignment as described above is involved, a high transmittance characteristic during application of a voltage can be maintained as such even under a memory state in the absence of an applied voltage.

More specifically, FIG. 6 shows a transmittance curve 61 when a pulse 62 with a voltage of 10 V and a pulse duration of 500 μsec is applied, and it can be seen that the transmittance obtained under the pulse application is maintained even under a memory state at a voltage of 0 V. FIG. 7 shows the transmittance curve 71 when the same pulse 72 of a voltage 10 V and a pulse duration 500 μsec is applied. According to this transmittance curve 71, the transmittance becomes high during application of the pulse, so that flickering is caused during driving. Further, under the memory state of a zero voltage, the transmittance is abruptly lowered to provide a dark display picture. As a result, a uniform alignment state is preferable in order to remove flickering and also to increase the tilt angle.

Further, in a preferable example of the present invention, an AC application pre-treatment is effective to have the ferroelectric liquid crystal assume the uniform alignment state shown in FIG. 4. By the AC application pre-treatment, the tilt angle $\theta$ as mentioned above can be increased up to the tilt angle    in the helical structure or to a level approximate thereto. The AC used for this purpose may have a voltage of 20 to 500 V, preferably 30 to 150 V and a frequency of 10 to 500 Hz, preferably 10 to 200 Hz, and the AC application pre-treatment can be applied for a time of several seconds to about 10 minutes. Also such AC application pretreatment may be practiced, for example, at a stage before writing operation performed corresponding to picture signals or information signals in a liquid crystal device. Preferably, the above mentioned AC application pretreatment may be practiced during a waiting period after such a liquid crystal device is assembled in an apparatus and before such apparatus is operated, or alternatively the AC application pretreatment can be applied also during manufacturing of such a liquid crystal device.

Such AC application pretreatment can make the tilt angle $\theta$ before application increased to an angle approximate to the tilt angle H in the helical structure, and yet the increased tilt angle can be maintained even after such AC application is terminated.

Also, such AC application pre-treatment is effective for a ferroelectric liquid crystal with a large spontaneous polarization (e.g., 5 nC/cm² or more, preferably 10 nC/cm²-300 nC/cm² at 25°C.; nC represents a unit nanocoulomb). This spontaneous polarization can be measured with a 100μ cell according to the triangular wave application method*.

*According to "Direct Method with Triangular Waves for Measuring Spontaneous Polarization in Ferroelectric Liquid Crystal" by K. Miyasato, et. al., in Japanese Journal of Applied Physics, Vol. 22(10), p. 661-663 (1983).

The present invention is described below by referring to specific Examples and Comparative Examples, in which "parts" represent parts by weight.

In each Each example, a liquid crystal cell was prepared by assembling two electrode plates, i.e., two sheets of glass plates each provided with 1000 Å thick ITO (indium-tin-oxide) stripe electrodes coated with a short circuit-prevention layer of 500 Å-thick SiO₂ and further with an alignment control layer prepared in the manner explained in the following Examples.

EXAMPLE 1

12.3g of 2,2-bis(4-(4-aminophenoxyphenyl))propane was added to 189 ml of N,N-dimethylformamide and stirred to form a uniform solution, into which 7.5 g of 3,5,6-tricarboxy-2-carboxymethylnorbornane2:3, 5:6-dianhydride was added, followed by 6 hours of stirring at room temperature to result in a pale brownish viscous liquid. The viscous liquid was poured in a large amount of toluene to cause precipitation, whereby 17.6 g of polyamic acid was obtained in the form of a white solid.

The thus obtained polyamic acid was dissolved at a concentration of 2 wt. % in dimethylformamide applied on electrode plates as described above by means of a spinner coater rotating at 3000 rpm for 180 seconds. After the film formation, the films were subjected to 1 hour of heat-curing at 250°C. for 1 hour to form coating films of a polyimide having a recurring unit represented by the following formula (1). The coating films thus obtained had a thickness of about 200 Å respectively.

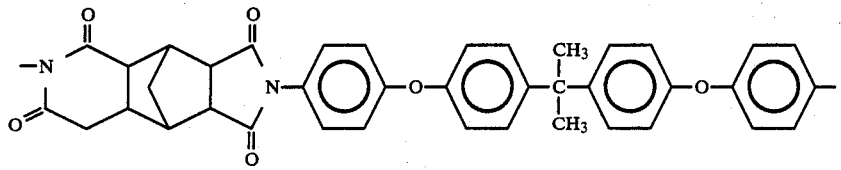

The coating films were rubbed with an acetate fiber-planted cloth and then washed with isopropyl alcohol. Alumina beads of an average particle size of about 1 $\mu$ were dispersed on one of the two electrode plates thus prepared, and the other plate was superposed thereon and fixed thereto so that the rubbing axes provided to the two plates were parallel to each other to form a blank cell.

The cell thickness of the cell was measured by means of Berek compensator (i.e., measurement by phase difference) to be about 1$\mu$m. After injection under vacuum of an ester-type ferroelectric liquid crystal mixture ("CS-1011" (trade name) produced by Chisso K.K.) into the cell under isotropic phase, the ferroelectric liquid crystal could be aligned by cooling gradually from isotropic phase to 60° C. at a rate of 0.5° C./h. Experiments were thereafter conducted at 60° C.

The phase transition characteristics of "CS-1011" as mentioned above were as follows.

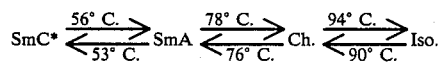

(SmA: smectic A phase, Ch.: cholesteric phase, Iso.: isotropic phase).

When the cell was observed under crossed nicols, a monodomain of a chiral smectic C phase with a uniform and defect-free non-helical structure was found to be obtained.

Next, a high electrical field AC voltage of 70 volt and a frequency of 70 Hz was applied to the liquid crystal cell as described above for about 1 minute (AC application pre-treatment). The tilt angle $\theta$ at this time was measured to be 18 °.

A tilt angle $\theta$ is generally measured by applying a pulse electrical field (10 V; 500 $\mu$sec) to a liquid crystal cell to orient the liquid crystal molecules to one stable state and observe the position providing the darkest state where the amount of transmitted light becomes the lowest while rotating the liquid crystal cell under cross nicols, and then applying a pulse electrical field of the opposite polarity to the previous pulse (−10V; 500$\mu$sec) to transform the liquid crystal molecules to another stable molecular orientation state which provides a bright state and observing again an angle for providing the darkest state by rotating the liquid crystal cell. The positions for the two darkest states correspond to two stable average molecular axes of the liquid crystal and the angle between the two states corresponds to 2$\theta$, i.e., twice the tilt angle $\theta$.

The liquid crystal cell of this example was found to maintain the tilt angle 18° over a period of one week or longer.

Also, when the liquid crystal device of this example was subjected to multiplexing drive under the driving conditions shown below, a display picture free of flickering was found to be formed. Driving conditions:

(1) First step: A signal of pulse duration of 500 $\mu$sec and voltage of 10 V was applied to all scanning lines and a signal of pulse duration of 500 $\mu$sec and voltage of −5 V applied to all signal lines at one time.

(2) Second step: A scanning selection signal of pulse duration of 500 $\mu$sec and voltage of 10 V was sequentially applied to the scanning lines and, in phase with the scanning selection signal, a signal of pulse duration of 500 $\mu$sec and voltage of 5 V and a signal of pulse duration of 500 $\mu$sec and voltage of −5 V were applied selectively to the signal lines.

Further when the liquid crystal device was placed at the darkest position under cross nicol polarizers after removal of the electric field, the resultant color tone was black as observed through a microscope at the magnification of 40.

The device was driven by application of a driving voltage of 10 V and a pulse duration of 500 msec, whereby a clear display with sharp display edges was obtained.

EXAMPLE 2

20.48 g (0.102 mol) of diaminodiphenyl ether (DDE) was dissolved in 247.5 g of N,N-dimethylformamide (DMF), and 23.15 g of 2,3,5-tricarboxycyclopentylacetic acid and dianhydride (TCA·AH) was added thereto as it was in the form of powder, followed by reaction at 25° C. under stirring. After 24 hours, a small portion of the reaction liquid was sampled and diluted by addition of dimethylformamide to provide a concentration of 0.5 g/100 ml of the polyamic acid, whereby the inherent viscosity ($\eta_{inh}$) of the polyamic acid was measured to be 0.99 dl/g.

Then, dimethylformamide was further added to the reaction liquid to provide a solution having a polyamic acid concentration of 6.1 wt. %, and 30 g of the solution was transferred to a 100 ml-flask. To the solution were further successively added 1.32 g of glacial acetic acid and 1.02 g of pyridine, and the resultant mixture was stirred and reacted for 2 hours at 135° C.

Then, the reaction product was poured in a large amount of methanol to precipitate the soluble polyimide, which was then recovered and dried overnight at 80° C. to obtain a polyimide resin having a recurring unit represent by the following formula (2).

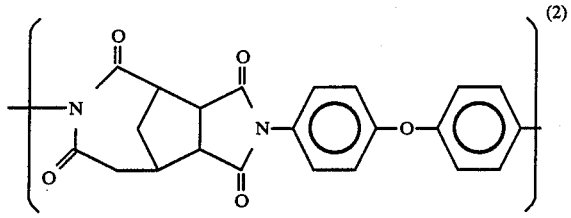
(2)

The thus obtained polyimdie was dissolved at a concentration of 2wt. % in dimethylformamide and applied onto electrode plates as described by means of a spinner coater rotating at 3000 rpm for 180 seconds. After the film formation, the films were heated at 170° C. for 1 hour, and by using the electrode plates, a liquid crystal cell was prepared in the same manner as in Example 1.

The thus prepared liquid crystal cell was subjected to application of a high electric field AC voltage of 70 volts and a frequency of 70 Hz for 1 minute (AC application pre-treatment) as in Example 1. The tilt angle $\theta$ was measured to be 18.5°. The liquid crystal cell was found to maintain the tilt angle of 18° or above more than one week, and no flickering at the time of writing was observed.

When the liquid crystal device was evaluated and driven in the same manner as in Example 1, whereby the darkest state color was black through microscopic observation, and a sharp display with clear images was formed.

EXAMPLES 3-7

Liquid crystal cell were prepared in the same manner as in Example 1 except for using polyimides having recurring units shown in Table 1 below and subjected to experiments in the same manner as in Example 1. The results of the tilt angles $\theta$ after the AC application and the tilt angles after one week of standing are shown in Table 1 below. Moreover, the respective cells provided a darkest state color of black and a sharp display with clear images.

TABLE 1

| Example | Resin | Tilt angle ($\theta$) after AC application | Tilt angle ($\theta$) after 1 week |
|---|---|---|---|
| 3 | | 19° | 19° |
| 4 | | 19.5° | 19.5° |
| 5 | | 18.5° | 18.5° |
| 6 | | 18.0° | 18.0° |
| 7 | | 18.5° | 18.5° |

COMPARATIVE EXAMPLE 1

A liquid crystal cell was prepared according to entirely the same method as in Example 1 except that the alignment control films were composed of a polyimide resin (polyimide formed by subjecting a coating film of a 3.5 wt. %-N-methyl-2-pyrrolidone solution of a polyamic acid obtained by dehydrating condensation reaction of 3,3′,4,4′-diphenyltetracarboxylic anhydride and p-phenylenediamine at a molar ratio of 1:1 to dehydrocyclization), and the same AC application pre-treatment as in Example 1 was conducted.

The tilt angle $\theta$ of the liquid crystal cell at that time was measured to be 8°. Also, when the liquid crystal cell used to form a display picture by the same multiplexing drive as in Example 1, flickering was observed during writing.

The liquid crystal device provided a darkest state color of blue and the images formed thereby were not clear.

COMPARATIVE EXAMPLE 2

A liquid crystal cell was prepared according to entirely the same method as in Example 1 except that the polyimide alignment control films were those of polyvinyl alcohol, and the same AC application pre-treatment was conducted.

The tilt angle $\theta$ of the liquid crystal cell at that time was measured to be 17.5°. Further, the time period in which the tilt angle $\theta$ of this liquid crystal cell was maintained was measured, whereby it was found that the tilt angle was reduced to 15.5° on the second day and the tilt angle was reduced to about 10° after one week. Also, when the liquid crystal cell after standing for 1 week was used to form a display picture by the same multiplexing drive as in Example 1, flickering was observed during writing.

The liquid crystal device provided a darkest state color of black, but substantial alignment defects were observed and an inclination of unistabilization was observed to result in grayish dull images.

As described above, according to the present invention, it is possible to realize a ferroelectric liquid crystal device with uniform alignment state capable of providing an increased tilt angle, and also the uniform alignment state can be maintained stably over a long period. Further, the liquid crystal device provides a darkest state color of black and clear images on driving.

What is claimed is:

1. A ferroelectric liquid crystal device comprising a pair oof sustrates an aligment control film of an aliphatic polyimide derived from a (i) tetracarboxylic acid or dianhydride and (ii) a diamine, at least one of which is aliphatic and a ferroelectric liquid crystal disposed between the pair of substrates.

2. A device according to claim 1, wherein said aliphatic polyamide has a structural unit represented by the formula:

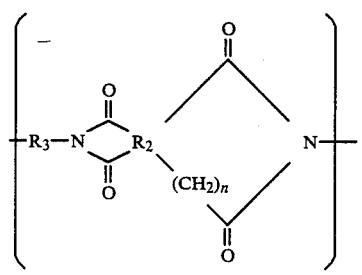

(A)

wherein $R_2$ is a tetravalent group, $R_3$ is a divalent group, at least one of $R_2$ and $R_3$ is an aliphatic group and the other can be an aromatic group and n is 0 or 1, said ferroelectric liquid crystal being disposed in a layer thin enough so as to release its helical structure and provide at least two bistable orientation states in the absence of an electric field.

3. A device according to claim 2, wherein said aliphatic polyimide has a structural unit represented by the formula:

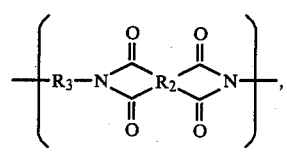

(Ia)

wherein $R_2$ is an aliphatic group, and $R_3$ is an aromatic group.

4. A device according to claim 3, wherein said aliphatic polyimide has a structural unit represented by the formula:

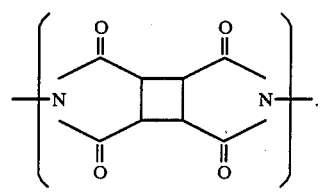

(II)

5. A device according to claim 2, wherein said aliphatic polyimide has a structural unit represented by the formula:

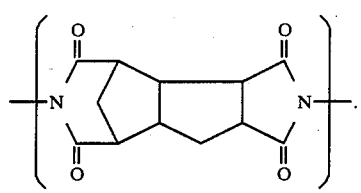

(III)

6. A device according to claim 2, wherein said aliphatic polyimide has a structural unit represented by the formula:

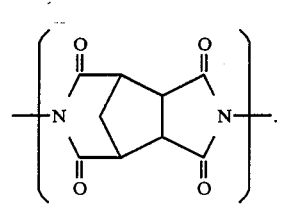

(IV)

7. A device according to claim 2, wherein said aliphatic polyimide has a structural unit represented by the formula:

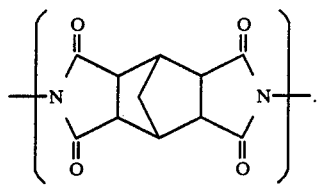
(V)

8. A device according to claim 2, wherein said aliphatic polyamide has a structural unit represented by the formula:

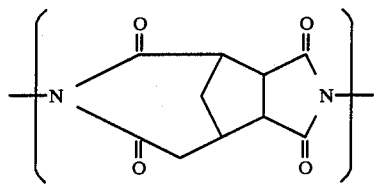
(VI)

9. A device according to claim 2, wherein said aliphatic polyimide has a structural unit represented by the formula:

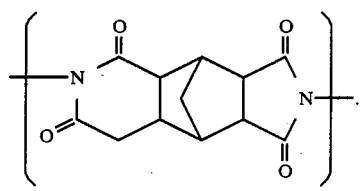
(VII)

10. A device according to claim 2, wherein said aliphatic polyimide has a structural unit represented by the formula:

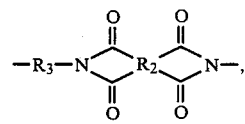
(VIII)

wherein $R_2$ is an aromatic group and $R_3$ is an aliphatic group.

11. A device according to claim 2, wherein said aliphatic polyimide has a structural unit represented by the formula:

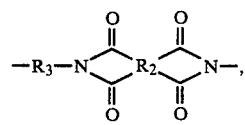
(IX)

wherein $R_2$ is an aromatic group and $R_3$ is an alicyclic group.

12. A device according to claim 2, wherein said aliphatic polyimide has a structural unit represented by the formula:

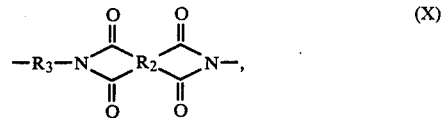
(X)

wherein $R_2$ is an alicyclic group and $R_3$ is an aromatic group.

13. A device according to claim 2, wherein said aliphatic polyimide has a structural unit represented by the formula:

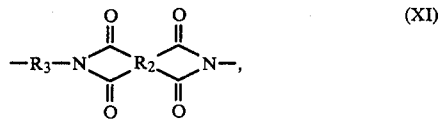
(XI)

wherein $R_2$ and $R_3$ are respectively an aliphatic group.

14. A device according to claim 2, wherein said aliphatic polyimide has a structural unit represented by the formula:

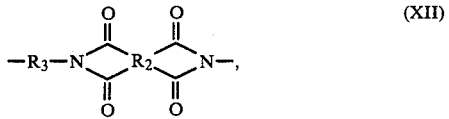
(XII)

wherein $R_2$ and $R_3$ are aliphatic group, either one of which is an alicyclic group.

15. A device according to claim 1, wherein said aliphatic polyimide comprises 100–200,000 repetitions of the structural unit.

16. A device according to claim 1, wherein said aliphatic polyamide comprises 500–5000 repetitions of the structural unit.

17. A device according to claim 1, wherein said alignment control film has a uniaxial orientation axis.

18. A device according to claim 17, wherein said uniaxial orientation axis has been provided by rubbing.

19. A device according to claim 1, wherein said ferroelectric liquid crystal is in a chiral smectic phase.

20. A device according to claim 1, wherein said ferroelectric liquid crystal is a chiral smectic liquid crystal in a nonhelical structure and provides a tilt angle of 18° or above.

21. A device according to claim 1, wherein said aliphatic polyimide film has a thickness of 30 Å to 1 μ.

22. A device according to claim 1, wherein said aliphatic polymide film has a thickness of 50 Å to 2000 Å.

23. A device according to claim 1, wherein said aliphatic polyimide film has a thickness of 70 Å to 1000 Å.

* * * * *

UNITED STATES PATENT AND TRADEMARK OFFICE
CERTIFICATE OF CORRECTION

PATENT NO. : 4,879,059
DATED : November 7, 1989
INVENTOR(S) : YUKIO HANYU, ET AL.

Page 1 of 2

It is certified that error appears in the above-identified patent and that said Letters Patent is hereby corrected as shown below:

COLUMN 3

Line 17, "by" should read --by the following formulas (I), (Ia) and (II) - (XII):--.

COLUMN 10

Line 67, "4-(2α-methylbutyl) phenyl-4'-" should read --4-(2'-methylbutyl)-phenyl-4'- --.

COLUMN 11

Line 4, "(441 -methylhexyl)-" should read --4"-methylhexyl)- --.

COLUMN 12

Line 16, "tilt angle      " should read --tilt angle Ⓗ --.

COLUMN 17

Line 46, "oof sustrates an aligment" should read --of substrates, an alignment--.
    Line 52, "polyamide" should read --polyimide--.

COLUMN 18

Line 4, "bistable" should read --stable--.
    Line 22, "claim 3," should read --claim 2,--.

UNITED STATES PATENT AND TRADEMARK OFFICE
CERTIFICATE OF CORRECTION

PATENT NO. : 4,879,059

DATED : November 7, 1989

INVENTOR(S) : YUKIO HANYU, ET AL.

Page 2 of 2

It is certified that error appears in the above-identified patent and that said Letters Patent is hereby corrected as shown below:

COLUMN 19

Line 12, "polyamide" should read --polyimide--.

COLUMN 20

Line 36, "aliphatic group," should read
        --aliphatic groups,--.
    Line 42, "polyamide" should read --polyimide--.

Signed and Sealed this

Thirty-first Day of March, 1992

*Attest:*

HARRY F. MANBECK, JR.

*Attesting Officer*    *Commissioner of Patents and Trademarks*